(12) United States Patent
Kanskar

(10) Patent No.: US 10,951,001 B2
(45) Date of Patent: Mar. 16, 2021

(54) TANDEM PUMPED FIBER LASER OR FIBER AMPLIFIER

(71) Applicant: NLIGHT, INC., Vancouver, WA (US)

(72) Inventor: Manoj Kanskar, Portland, OR (US)

(73) Assignee: NLIGHT, INC., Vancouver, WA (US)

(\*) Notice: Subject to any disclaimer, the term of this patent is extended or adjusted under 35 U.S.C. 154(b) by 470 days.

(21) Appl. No.: 15/868,903

(22) Filed: Jan. 11, 2018

(65) Prior Publication Data

US 2018/0198251 A1 Jul. 12, 2018

Related U.S. Application Data

(60) Provisional application No. 62/446,069, filed on Jan. 13, 2017, provisional application No. 62/445,703, filed on Jan. 12, 2017.

(51) Int. Cl.
*H01S 3/23* (2006.01)
*H01S 3/067* (2006.01)
(Continued)

(52) U.S. Cl.
CPC ........ *H01S 3/09408* (2013.01); *H01S 3/0675* (2013.01); *H01S 3/06733* (2013.01); *H01S 3/094003* (2013.01); *H01S 3/094038* (2013.01); *H01S 3/094042* (2013.01); *H01S 3/094053* (2013.01); *H01S 3/2308* (2013.01); *H01S 3/0085* (2013.01); *H01S 3/06708* (2013.01);
(Continued)

(58) Field of Classification Search
CPC ............. H01S 3/06737; H01S 3/06754–06787
See application file for complete search history.

(56) References Cited

U.S. PATENT DOCUMENTS 10,211,591 B2 2/2019 Kanskar
2002/0008901 A1 1/2002 Kinoshita
(Continued)

FOREIGN PATENT DOCUMENTS

AU 2009200094 2/2009
CN 102292883 12/2011
(Continued)

OTHER PUBLICATIONS

Christopher A. Codemard et al.; "Tandem Pumping of Large-Core Double-Clad Ytterbium-Doped Fiber for Control of Excess Gain"; Lasers, Sources and Related Photonic Devices; University of Southampton, UK; copyright 2010 Optical Society of America; 3 pages.
(Continued)

*Primary Examiner* — Eric L Bolda
(74) *Attorney, Agent, or Firm* — Schwabe Williamson & Wyatt

(57) ABSTRACT

In an example, an apparatus to tandem pump a fiber laser or fiber amplifier may include a combiner; a power amplifier or a power oscillator, or a combination thereof, coupled to an output of the combiner; a seed laser to output light to the power amplifier or the power oscillator, or the combination thereof, via the combiner; and a tandem pump to generate light of a pump source signal, wherein the light of the pump source signal is output to the combiner to cladding pump the power amplifier or the power oscillator, or the combination thereof. Other embodiments may be disclosed and/or claimed.

12 Claims, 6 Drawing Sheets

(51) Int. Cl.
  *H01S 3/16* (2006.01)
  *H01S 3/0941* (2006.01)
  *H01S 3/10* (2006.01)
  *H01S 3/094* (2006.01)
  *H01S 3/00* (2006.01)

(52) U.S. Cl.
  CPC ....... *H01S 3/06758* (2013.01); *H01S 3/09415* (2013.01); *H01S 3/094007* (2013.01); *H01S 3/10092* (2013.01); *H01S 3/1618* (2013.01); *H01S 2301/03* (2013.01)

(56) References Cited

U.S. PATENT DOCUMENTS

| | | | | |
|---|---|---|---|---|
| 2005/0024716 | A1* | 2/2005 | Nilsson | H01S 3/302 359/341.31 |
| 2005/0207455 | A1* | 9/2005 | MacCormack | H01S 3/06754 372/6 |
| 2006/0187973 | A1* | 8/2006 | Varnham | H01S 3/094042 372/6 |
| 2007/0115541 | A1* | 5/2007 | Rogers | H01S 3/06754 359/345 |
| 2008/0130102 | A1 | 6/2008 | Murison | |
| 2010/0202481 | A1 | 8/2010 | Morasse | |
| 2011/0249321 | A1 | 10/2011 | Savage-Leuchs | |
| 2012/0057220 | A1* | 3/2012 | Langseth | H01S 3/0675 359/341.3 |
| 2013/0322470 | A1* | 12/2013 | Creeden | H01S 3/1616 372/6 |
| 2014/0083197 | A1 | 3/2014 | Zadok | |
| 2015/0138630 | A1* | 5/2015 | Honea | H01S 3/042 359/341.3 |
| 2018/0109064 | A1 | 4/2018 | Kanskar | |
| 2018/0145476 | A1* | 5/2018 | Price | H01S 3/1603 |
| 2019/0097377 | A1 | 3/2019 | Kanskar | |

FOREIGN PATENT DOCUMENTS

| | | |
|---|---|---|
| CN | 103560382 | 2/2014 |
| CN | 105305211 | 2/2016 |
| WO | WO2005057737 | 6/2005 |
| WO | WO2010083595 | 7/2010 |
| WO | WO2018071712 | 4/2018 |
| WO | WO2018186920 | 10/2018 |

OTHER PUBLICATIONS

Hao Jin-Ping et al.; "Optical Properties of Ytterbium-Doped Tandem-Pumped Fiber Oscillator"; Chinese Physics, Bristol GB; vol. 23, No. 1; Jan. 28, 2014; p. 14203.

European Patent Office (EPO, Rijswijk, NL); International Search Report and Written Opinion PCT/US2017/056402 dated Feb. 23, 2018; 18 Pages.

European Patent Office; International Search Report and Written Opinion PCT/US2019/062285 dated Mar. 18, 2020; 16 Pages.

Xiao Hu et al.; "Experimental Study on Tandem Pumped Fiber Amplifier"; Optics and Laser Technology, vol. 44, No. 5; copyright 2012 Elsevier Ltd.; 4 pages.

Chang You Min et al.; "3% Thermal IJad Measured in Tandem-pumped Yterrbium-doped Fiber Amplifier"; 2014 Conference on Lasers and Electro-Optics (CLEO)—Laser Science Photonic Applications, The Optical Society, Jun. 8, 2014; 2 pages.

Hu Xiao et al; "High Power 1018 nm ytterbium-doped fiber laser and its application in tandem pump"; Applied Optics, vol. 54, No. 27; Sep. 16, 2015; 4 pages.

Tianfu Yao et al.; "Tandem-pumped ytterbium-doped aluminosilicate fiber amplifer with low quantum defect"; Lasers and Electro-Optics (CLEO), 2012 Conference, ON, IEEE; May 6, 2012; 2 pages.

Wang Xuejiao et al.; "First experimental investigation of the amplification of a Yb-doped fiber laser pumped with 1000 and 1014-nm laser diodes", Optical Review, Springer Verlag, Tokyo, JP, vol. 22, No. 5; Jul. 21, 2015, pp. 593-699.

European Patent Office (EPO, Rijswijk, NL); International Search Report and Written Opinion PCT/US2018/013402 dated Nov. 9, 2018; 12 pages.

Beier, F. et al.; "6.8 kW Peak Power Quasi-Continuous Wave Tandem-pumped Ytterbium Amplifier at 1071nm nm"; Fiber Lasers XII: Technology Systems and Applications; Proc. of SPIE vol. 9344, 93441H (Mar. 4, 2015); 3 pages.

Zhou, Pu et al.; "High-Power Fiber Lasers Based on Tandem Pumping"; Journal Optical Society of America, vol. 34, No. 3; Mar. 2017; 8 pages.

Naderi, Shadi et al.: "Theoretical Analysis of Effect of Pump and Signal Wavelengths on Modal Instabilities in Yb-doped Fiber Amplifiers"; Proc. of SPIE vol. 8964 8964W-1; (Feb. 20, 2014); 7 pages.

Engin, "1kW cw fiber-amplifier with < 0.5 GHz linewidth and near-diffraction limited beam-quality for coherent combining application", Feb. 21, 2011, Proceedings of SPIE 7914, 791407-1, 791407-7 (2011).

Flores, "Pseudo-random binary sequence phase modulation for narrow linewidth, kilowatt, monolithic fiber amplifiers," Jul. 28, 2014, Optics Express, vol. 22, No. 15, pp. 17735-17744 (2014).

* cited by examiner

25

TANDEM PUMPED FIBER LASER OR FIBER AMPLIFIER

CROSS REFERENCE TO RELATED APPLICATION

This application claims the benefit of U.S. Provisional Application Nos. 62/445,703, filed Jan. 12, 2017, and 62/446,069 filed Jan. 13, 2017, which are incorporated herein by reference in their entirety.

TECHNICAL FIELD

The present disclosure relates to fiber laser power systems.

BACKGROUND

High average power fiber lasers with diffraction-limited beams that are suitable for High Energy Laser (HEL) applications are currently primarily limited in output power by Stimulated Brillouin Scattering (SBS) and Modal Instability. Some known systems have been effective to scale power to greater than the 2 kW level by mitigating SBS. However, Model Instability may still bottleneck power-scaling in regular large-mode area (LMA) fiber, e.g., non-photonic-crystal fiber (PCF) and/or photonic bandgap (PBG) fiber. Specifically, Modal Instability may limit diffraction limited output power to a threshold near 2 kW, such as ~2.2 kW for 20 µm core step-index dual-clad fiber laser near 1064 nm wavelength.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

Figure 1:
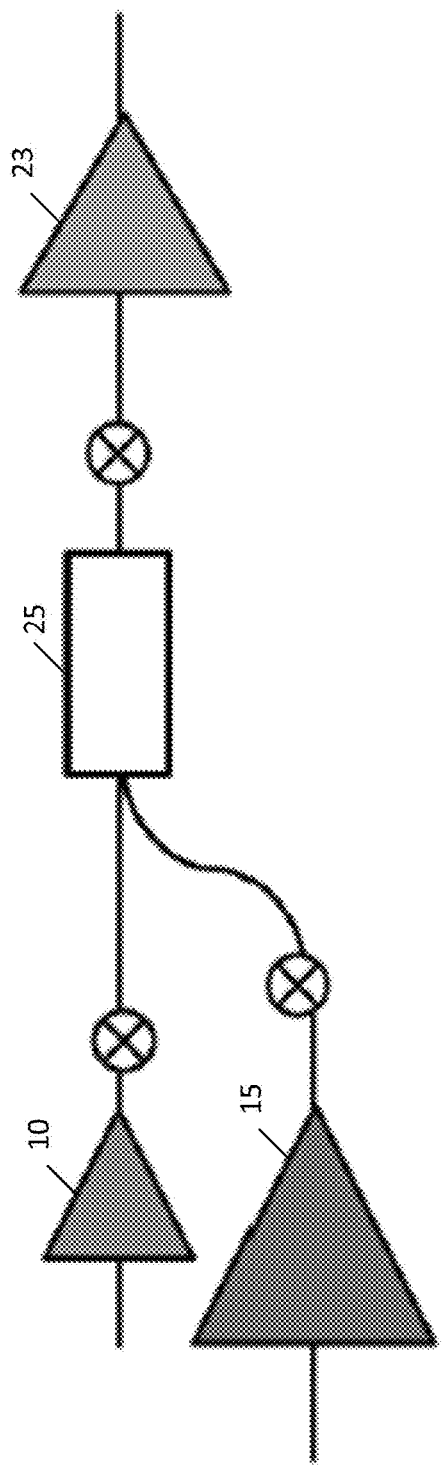
FIG. 1 illustrates a block diagram of a tandem pumped fiber amplifier or fiber oscillator system, according to various embodiments.
Figure 5A:
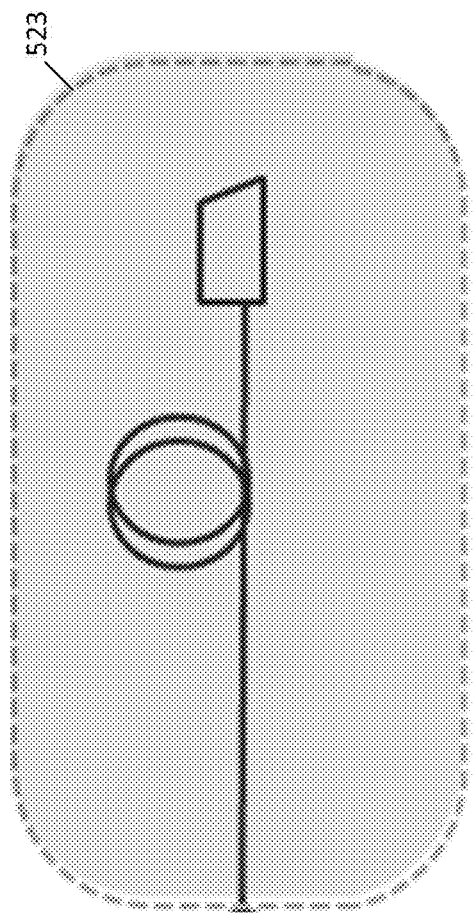
Figure 5B:
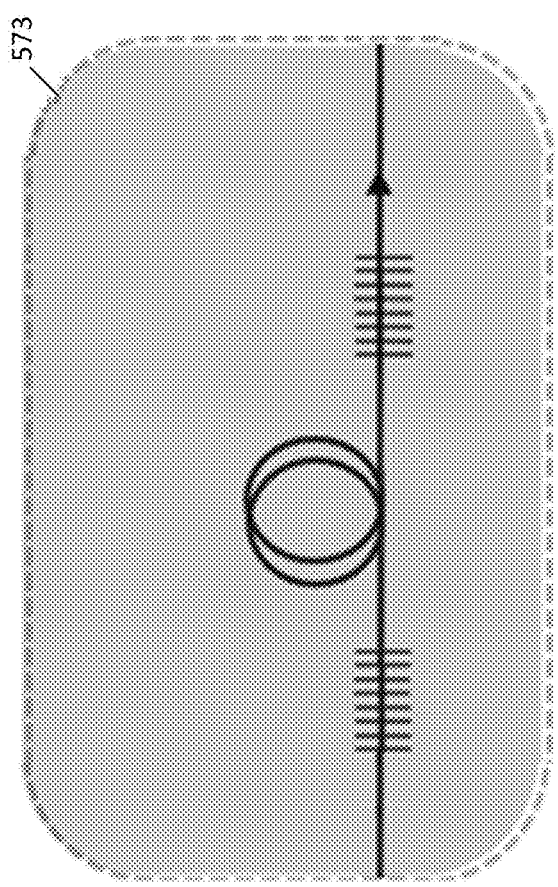

FIGS. 5A-B illustrate detailed block diagrams of different devices that may be tandem pumped using the system of FIG. 1, according to various embodiments.

Figure 6:
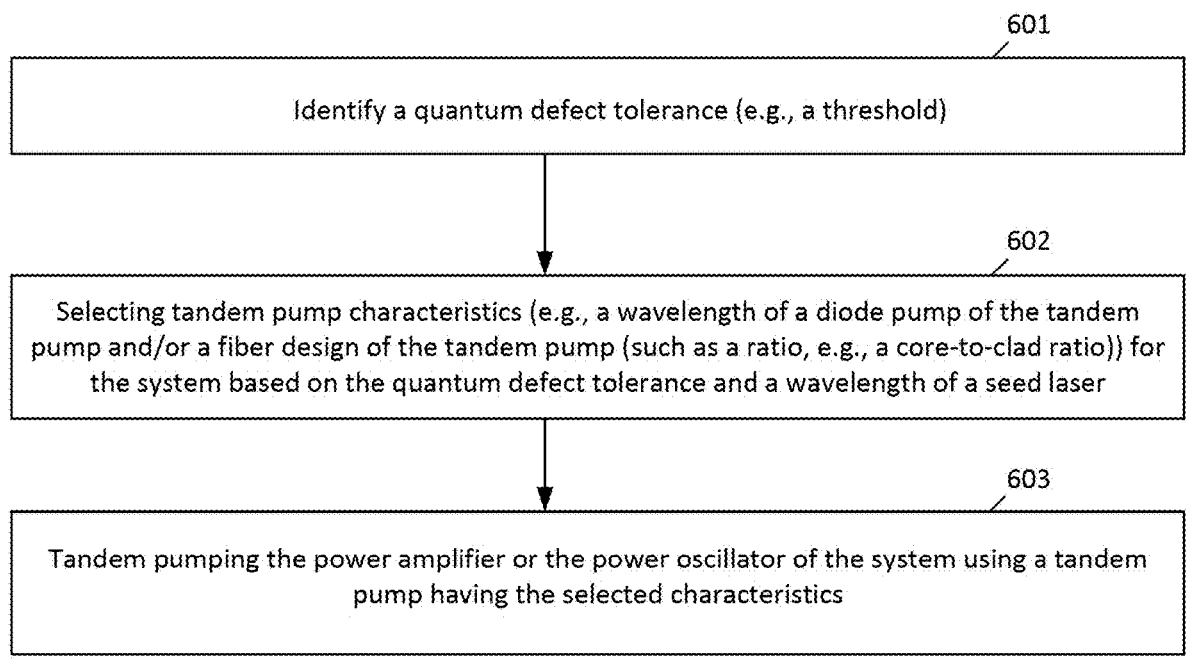

FIG. 6 illustrates a process of designing a tandem pumped fiber amplifier or fiber oscillator system, according to various embodiments.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another.

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Modal Instability (MI) may be seeded by higher order modes in LMA fibers and the threshold may be highly dependent on the strength of the thermal grating generated by the local quantum-defect heating and the higher order mode (HOM) suppression ratio. Significant improvement in MI-thresholds may be achieved when the quantum-defect heating is reduced from the usual ~9% in the 976 nm pumped system down to ~4% in the tandem 1018 nm pumped amplifiers. There may be an additional advantage of tandem pumping since the seeding power in the final amplifier stage could be greater than 1 kW which may also raise the MI-threshold. Disclosed herein is a new approach to tandem pumping that allows low SWAP (size, weight, and power) and low cost laser diodes to be primarily used instead of a multitude of expensive single or few-moded fiber lasers to achieve low quantum-defect pumping. Some embodiments include a simplified fiber and tandem clad-pumped fiber amplifier architecture.

Described herein is a fiber and tandem clad-pumped fiber amplifier architecture that may be compatible with LMA fiber technology but scalable from a few kilowatts to at least 10 kW by scaling up the multimode diode laser pump power. As a result, manufacturing may be simplified, at least one of size, weight or power may be reduced (e.g., at least one of the size, weight or power may be reduced by at least 4x), and/or cost of very high power fiber amplifiers that are in Spectral Beam Combining (SBC) and Coherent Beam Combining (CBC) sources used in industrial or HEL applications (e.g., by at least 2x).

The tandem clad-pumped fiber amplifier architecture may use a single fiber laser or Master Oscillator Power Amplifier (MOPA) to tandem-pump a broadband or a narrowband fiber amplifier to avoid building numerous fiber laser/amps/MOPA to tandem-pump, thus providing a power-scalable and low SWAP/low cost architecture. This architecture may be beneficial for directed energy high energy laser application.

In some embodiments, a tandem clad-pumped fiber amplifier may include a seed laser with center wavelength in the 1020 nm to 1080 nm range which may be PRBS (pseudo random bit-sequence) phase-modulated to achieve necessary bandwidth to suppress SBS and keep coherence length long enough for SBC and CBC applications. A preamplifier may be employed to generate ~30-100 W of seed power (or more). Second and third stages of the amplifier design may be different than some known amplifier designs.

In some embodiments, the quantum defect in the power amplifier may be approximately 1.5% or less when the tandem pump wavelength is at 1030 nm. At a nominal signal wavelength of 1064 nm, the quantum defect may be less than half compared to pumping at 976 nm wavelength (e.g. at a nominal wavelength of 1064 nm, the quantum defect may be ~4% or less). The seed output signal injected into the power amplifier may be easily greater than 1 kW. Both of these factors may favor a high threshold condition for Modal Instability. Modeling and experimental results indicate that greater than 10 kW of SBC and CBC combinable power may be achieved. Some embodiments may use LMA fiber technology, and as such there may be no compromise in a total efficiency of the system. Some systems may include pumping with (e.g., pumping primarily with) low SWAP and low-cost multimode diode pumps rather than using a multitude of expensive and bulky single mode or few-moded fiber lasers.

The severe constraint posed on some systems by MI in power-scaling of fiber laser may be relaxed in some embodiments described herein. Some embodiments may include a fiber design and tandem clad-pumped fiber amplifier, and may provide a low SWAP and low cost single mode amplifier that can push the single channel output power in the near term to well beyond what is possible in some systems using LMA fiber technology (e.g., to 3 kW, and subsequently to 5 kW and then 10 kW or more).

FIG. 1 illustrates a block diagram of a tandem pumped fiber amplifier or fiber oscillator system 100 utilizing clad pumping, according to various embodiments. The system 100 may include a seed laser 10, a tandem pump 15, and a tandem-pumped device 23 (such as a power amplifier or a power oscillator) coupled to an output of combiner 25.

The tandem pump 15 may be a diode pump assembly, a diode-laser-pumped fiber amplifier (e.g., a diode-pumped master oscillator and power amplifier (MOPA) in some embodiments), a diode-pumped fiber oscillator assembly, or the like, or combinations thereof. The tandem-pumped device 23 may be clad pumped by the tandem pump 15.

Tandem-pumping with a single multimode fiber laser (i.e. one multimode fiber laser) is possible using the system 100. Any single multimode fiber MOPA or a fiber oscillator with sufficient power to tandem-pump the power amplifier may be used for tandem pump 15. In various embodiments, a power output of the tandem pump may be ~5 kW and a power output of the seed laser 10 may be 50 W or more. The tandem-pumped device 23 (e.g., a power amplifier or a power oscillator) may have a power output of greater than 2.2 kW, e.g., 4-10 kW (or more) in some embodiments).

A center wavelength of the seed laser 10 may be a first wavelength, such as a first wavelength in the 1020 nm to 1080 nm range. A center wavelength of the tandem pump 15 (e.g., of light output from the tandem pump 15) may be a second wavelength such that the quantum defect associated with the tandem pump compared to the seed laser wavelength may be less than 4%. For instance, a value of one of the wavelengths may be within 3% of the value of the other wavelength (for instance the second wavelength may be 1034 nm and the first wavelength may be 1064 nm). This may reduce energy loss and minimize unwanted heat generation, which may enable a low SWAP design.

Figure 2:
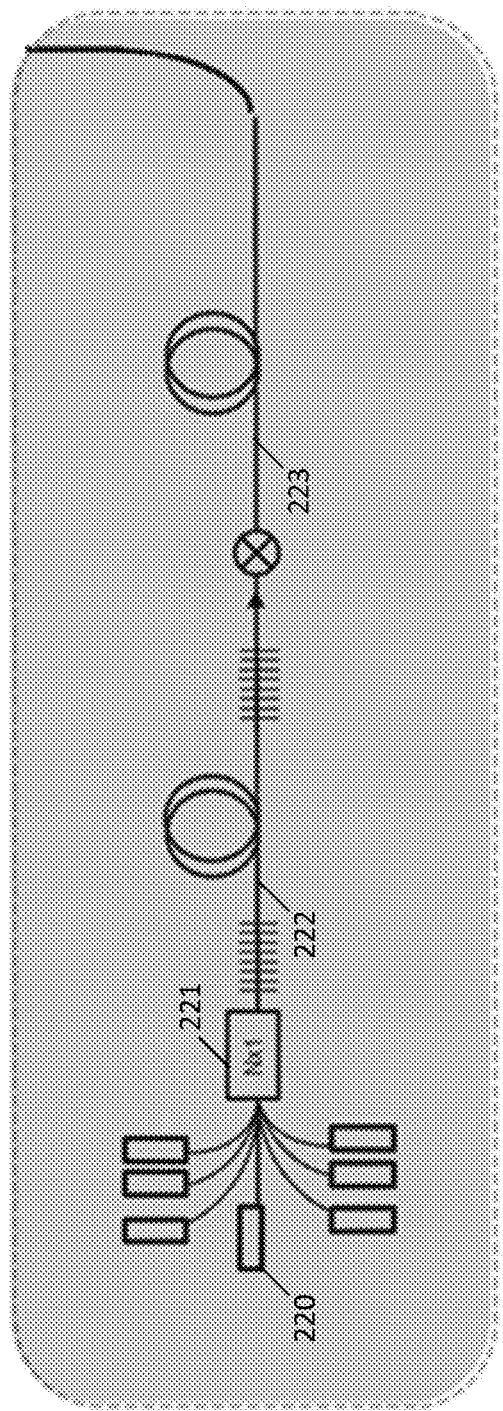
FIG. 2 illustrates a detailed block diagram of the tandem pump of the system of FIG. 1, according to various embodiments.

FIG. 2 illustrates a detailed block diagram of the tandem pump 15 of the system 100 of FIG. 1, according to various embodiments. The tandem pump 15 may include an N×1 combiner 221, and a set of N diode lasers 220. In the illustrated example, N=7 but in other examples N can be any number depending on application requirements. In some embodiments, this tandem pump may be a diode-pumped fiber oscillator (e.g., with only diode pumps 220, combiner 221 and fiber laser oscillator 222) but need not be single mode.

Some side-pumped devices may require a multitude of fiber lasers to achieve a particular power output for a power amplifier. In contrast, some embodiments using the tandem pump 15 (e.g., the system 100 of FIG. 1, using the tandem pump 15) may utilize a single fiber laser to achieve the same or greater power output from a power amplifier. Such embodiments may be less expensive and bulky than a side-pumped devices requiring a multitude of fiber lasers to achieve the same (or lower) power output for a power amplifier.

The tandem pump 15 may include an oscillator 222 (e.g., an end-pumped triple-clad fiber (TCF) oscillator), and an amplifier 223 (e.g., an end-pumped TCF amplifier). As will be explained later in more detail with reference to FIG. 6, characteristics of the tandem pump 15 (e.g., a fiber design of the tandem pump 15 and a wavelength of the diode pumps 320) may be selected based on a quantum defect of 4% or less. Solely for the purpose of illustration (not intended to be limiting), in one embodiment the tandem pump 15 may have the following characteristics:

The diode pumps 220 may be 976 nm pumps.
The oscillator 222 may include gain fiber between 1034 nm HR-FBG and PR-FBG. The oscillator 222 may include an approximately 13 μm core gain fiber with a 0.06 numerical aperture (NA), and an inner-clad with an approximately 600 μm inner diameter, an approximately 660 outer diameter, and a 0.22 NA.
The amplifier 223 may include an approximately 30 μm core gain fiber with a 0.06 NA, and an inner-clad with an approximately 600 μm inner diameter, an approximately 660 outer diameter, and a 0.22 NA.
The pump source signal generated by the tandem pump may have a center wavelength of approximately 1034 nm (for instance when paired with a seed laser having an approximately 1064 nm center wavelength).

Figure 3:
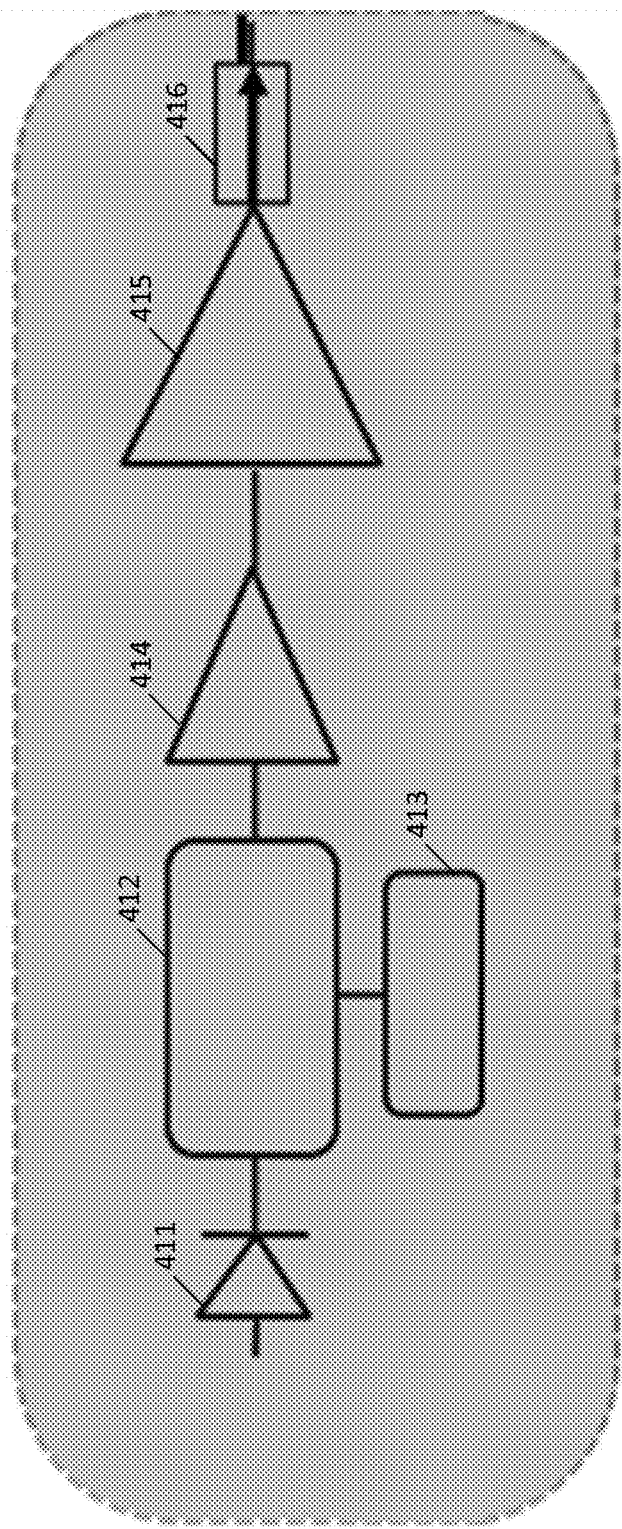
FIG. 3 illustrates a detailed block diagram of the seed laser of the system of FIG. 1, according to various embodiments.

FIG. 3 illustrates a detailed block diagram of the seed laser 10 of the system 100 of FIG. 1, according to various embodiments. The seed laser 10 (e.g., a seed laser system) may include a seed laser 411, a phase modulator 412, a PRBS 413 to provide PRBS-modulation to broaden linewidth for SBS suppression, a preamplifier 414, and a booster amplifier 415, and an isolator 416. Seed laser 411 may include a semiconductor Fabry-Perot laser, a distributed feedback (DFB) laser, a distributed Bragg reflector (DBR), a fiber laser oscillator, or the like, or combinations thereof.

The preamplifier 414 may output approximately 20 W, and the booster amplifier 415 may output at 100 W (15 GHz). A center wavelength of the seed laser may be in any range, such as 1020 nm to 1080 nm (e.g., 1064 nm in one example).

Figure 4:
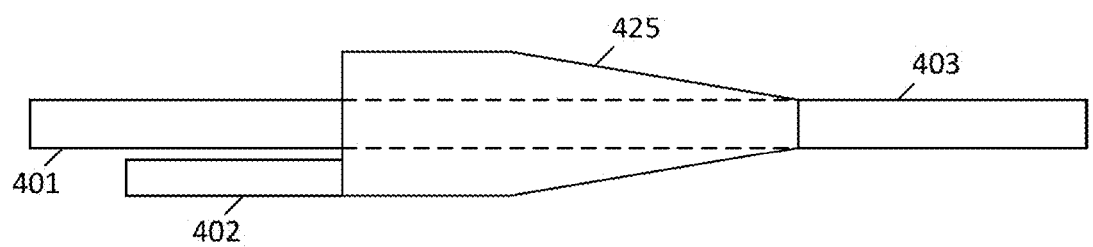
FIG. 4 illustrate a detailed block diagram of the combiner of the system of FIG. 1, according to various embodiments.

FIG. 4 illustrates a detailed block diagram of the combiner 25 of the system 100 of FIG. 1, according to various embodiments. The combiner 25 may be an N+1:1 combiner, e.g., a 1+1:1 combiner in one example or any other combiner, such as a tapered bundle fused combiner. Seed laser 10 may be coupled to an input 401 of the coupler 425, and a tandem pump 15 (such as a single tandem pump for a low SWAP architecture) may be coupled to another input 402 of the coupler 425. The coupler 425 may or may not include additional inputs, which may be left empty (for instance if the coupler 425 includes a circular array, only one input of the circular array may be used for the single tandem pump in a low SWAP architecture). An output 403 of the coupler 425 may be coupled to the tandem-pumped device 23. The illustrated coupler 425 is an over-sleeve coupler, but any coupler may be used (such as a tapered coupler or a tapered bundle fused type of coupler).

FIGS. 5A-B illustrate detailed block diagrams of different devices (e.g., power amplifier 523 and power oscillator 573) that may be tandem pumped using the system of FIG. 1, according to various embodiments. In some embodiments, the power amplifier 523 or power oscillator 573 may include a triple clad fiber (TCF). In one embodiment using a TCF, dimensions of power amplifier 523 may include a 25 µm core, a 105 µm inner clad (e.g., an octagonal inner clad), and a 400 µm outer clad. A center wavelength of the power amplifier 523 may be similar to a center wavelength of the seed laser 10 (e.g., 1064 nm in one embodiment).

FIG. 6 illustrates a process 600 of designing a tandem pumped fiber amplifier or fiber oscillator system, according to various embodiments. The process 600 may be used to select tandem pump characteristics for any tandem pumped fiber amplifier or fiber oscillator system described herein, such as system 100.

As mentioned previously, the severe constraint posed on some systems by MI in power-scaling of fiber laser may be relaxed using a tandem pumped fiber laser or fiber amplifier system architecture. Unlike some architectures that may be subjected to an MI bottleneck (which may constrain fiber design such as core size, due to the MI bottleneck), the system may not be subjected to the same MI bottleneck. This may relax the fiber design constraints, and additionally the center wavelength of the diode pump may be matched more closely to the center wavelength of an output of the tandem pump and/or a center wavelength of an output of a fiber laser amplifier or a fiber laser oscillator of the tandem pump. Thus, a center wavelength of diode pump 220 (FIG. 2) may not be limited to 976 nm. For instance, a 1020 nm diode pump, or other pump having a center wavelength closer to the center wavelength of the tandem pump (e.g., 1030 nm) may be used in this architecture. Consequently, quantum defect heating may be reduced from 5.5% down to only about 1% inside the tandem pump 15, the tandem pump characteristics (such as fiber design and/or center wavelength of the diode pumps of the tandem pump) may be selected accordingly. In some embodiments, a tandem pump is end-pumped using at least one diode pump, and quantum defect heating inside the tandem pump is 7% or less based on a correspondence of a center wavelength of an output of the at least one diode pump to a center wavelength of an output of a fiber laser oscillator of the tandem pump.

In block 601, a quantum defect tolerance (e.g., a threshold, such as 4%) for a tandem pumped fiber amplifier or fiber oscillator system may be identified. In one example, the quantum defect tolerance may be based on predetermined difference (e.g., 3% or less) between a center wavelength of a pump (to be generated by the tandem pump) and a center wavelength of the seed laser.

In block 602, tandem pump characteristics (e.g., a wavelength of a diode pump of the tandem pump and/or a fiber design of the tandem pump (such as a ratio, e.g., a core-to-clad ratio)) may be selected for the system based on the quantum defect tolerance and a wavelength of a seed laser to be used in the system. For instance, a center wavelength of a seed laser to be used in the system may be 1064 nm in one example.

In one example, the selected tandem pump characteristics may correspond to any tandem pump characteristics described herein (for instance, given a 1064 nm seed laser and a 4% quantum defect threshold, a tandem pump center wavelength of 1034 nm may be selected). Also, a diode pump of 1020 nm may be selected. In block 603, the power amplifier or the power oscillator (or a combination thereof) of the system may be tandem pumped using a tandem pump having the selected characteristics.

Examples

Example 1 is an apparatus, comprising: a combiner; a power amplifier or a power oscillator, or a combination thereof, coupled to an output of the combiner; a seed laser to output light to the power amplifier or the power oscillator, or the combination thereof, via the combiner; and a tandem pump to generate light of a pump source signal, wherein the light of the pump source signal is output to the combiner to cladding pump the power amplifier or the power oscillator, or the combination thereof.

Example 2 includes the subject matter of example 1 (or any other example described herein), wherein the tandem pump comprises a diode-pumped master oscillator and power amplifier (MOPA).

Example 3 includes the subject matter of any of examples 1-2 (or any other example described herein), wherein the diode-pumped MOPA comprises an end-pumped dual-clad or triple-clad fiber oscillator and a dual-clad or triple-clad fiber amplifier.

Example 4 includes the subject matter of any of examples 1-3 (or any other example described herein), wherein the tandem pump comprises a fiber laser oscillator.

Example 5 includes the subject matter of any of examples 1-4 (or any other example described herein), wherein the tandem pump comprises one or more diode lasers.

Example 6 includes the subject matter of any of examples 1-5 (or any other example described herein), wherein the tandem pump comprises a diode-pumped master oscillator and power amplifier.

Example 7 includes the subject matter of any of examples 1-6 (or any other example described herein), wherein the diode-pumped master oscillator and power amplifier further comprises: an N×1 combiner; a master oscillator and power amplifier coupled to an output of the N×1 combiner; and a plurality of diode pumps to output light to the N×1 combiner.

Example 8 includes the subject matter of any of examples 1-7 (or any other example described herein), wherein the tandem pump comprises an end-pumped dual-clad or triple-clad fiber.

Example 9 includes the subject matter of any of examples 1-8 (or any other example described herein), wherein a center wavelength of an output of the seed signal is in the 1020 nm to 1080 nm range.

Example 10 includes the subject matter of any of examples 1-9 (or any other example described herein), wherein a center wavelength of an output of the tandem pump is such that a quantum defect associated with the center wavelength of the output of the tandem pump compared to the center wavelength of the output of the seed signal is less than 4%.

Example 11 includes the subject matter of any of examples 1-10 (or any other example described herein), wherein the tandem pump comprises a single tandem pump.

Example 12 includes the subject matter of any of examples 1-11 (or any other example described herein), wherein the combiner comprises an N+1:1 combiner, wherein N is one or more.

Example 13 includes the subject matter of any of examples 1-12 (or any other example described herein), wherein the combiner comprises a circular array.

Example 14 includes the subject matter of any of examples 1-13 (or any other example described herein), wherein the combiner comprises an over-sleeve coupler, a tapered coupler, or a tapered bundle fused type of coupler.

Example 15 includes the subject matter of any of examples 1-14 (or any other example described herein), wherein the tandem pump is end-pumped using at least one diode pump, and wherein quantum defect heating inside the tandem pump is 7% or less based on a correspondence of a center wavelength of an output of the at least one diode pump to a center wavelength of an output of a fiber laser oscillator of the tandem pump.

Example 16 is a method of designing and operating a tandem pumped fiber laser or fiber amplifier having a low SWAP (size weight and power) architecture, the method comprising: identifying a quantum defect tolerance; selecting tandem pump characteristics based on the quantum defect tolerance, wherein the tandem pump characteristics include a tandem pump fiber design and a tandem pump wavelength; providing a seed laser to output light to a power amplifier or a power oscillator, or a combination thereof, via a combiner; providing a tandem pump corresponding to the tandem pump characteristics, the tandem pump having a core-to-clad ratio corresponding to the tandem pump fiber design and a diode pump with a center wavelength corresponding to the tandem pump wavelength; and generating light of a pump source signal using the tandem pump, wherein the light of the pump source signal is output to the combiner to cladding pump the power amplifier or the power oscillator, or the combination thereof.

Example 17 includes the subject matter of example 16 (or any other example described herein), wherein the tandem pump comprises a master oscillator and power amplifier (MOPA).

Example 18 includes the subject matter of any of examples 16-17 (or any other example described herein), wherein the MOPA is end-pumped using the diode pump.

Example 19 includes the subject matter of any of examples 16-18 (or any other example described herein), wherein one of a center wavelength of an output of the tandem pump and a center wavelength of an output of the seed laser is within 3% of the other of the center wavelengths.

Example 20 includes the subject matter of any of examples 16-19 (or any other example described herein), wherein the center wavelength of the output of the tandem pump is such that a quantum defect associated with the center wavelength of the output of the tandem pump compared to the center wavelength of the output of the seed signal is less than 4%.

In view of the many possible embodiments to which the principles of the disclosed technology may be applied, it should be recognized that the illustrated embodiments are only preferred examples and should not be taken as limiting the scope of the disclosure. I claim as my invention all that comes within the scope and spirit of the appended claims.

The invention claimed is:

1. An apparatus, comprising:
a combiner;
a power amplifier or a power oscillator, or a combination thereof, coupled to an output of the combiner;
a seed laser to output light to the power amplifier or the power oscillator, or the combination thereof, via the combiner; and
a tandem pump to generate light of a pump source signal, wherein the light of the pump source signal is output to the combiner to cladding pump the power amplifier or the power oscillator, or the combination thereof;
wherein the tandem pump is end-pumped using at least one diode pump, and wherein quantum defect heating inside the tandem pump is 7% or less based on a correspondence of a center wavelength of an output of the at least one diode pump to a center wavelength of an output of a fiber laser oscillator of the tandem pump.

2. The apparatus of claim 1, wherein the tandem pump comprises a diode-pumped master oscillator and power amplifier (MOPA).

3. The apparatus of claim 2, wherein the diode-pumped MOPA comprises an end-pumped dual-clad or triple-clad fiber oscillator and a dual-clad or triple-clad fiber amplifier.

4. The apparatus of claim 2, wherein the at least one diode pump comprises a plurality of diode pumps, and wherein the diode-pumped MOPA further comprises:
an N×1 combiner; and
a master oscillator and power amplifier coupled to an output of the N×1 combiner;
the plurality of diode pumps to output light to the N×1 combiner.

5. The apparatus of claim 1, wherein the tandem pump comprises a fiber laser oscillator.

6. The apparatus of claim 1, wherein the tandem pump comprises an end-pumped dual-clad or triple-clad fiber.

7. The apparatus of claim 1, wherein a center wavelength of an output of the seed laser is in the 1020 nm to 1080 nm range.

8. The apparatus of claim 7, wherein a center wavelength of an output of the tandem pump is such that a quantum defect associated with the center wavelength of the output of the tandem pump compared to the center wavelength of the output of the seed signal is less than 4%.

9. The apparatus of claim 1, wherein the tandem pump comprises a single tandem pump.

10. The apparatus of claim 9, wherein the combiner comprises an N+1:1 combiner, wherein N is one or more.

11. The apparatus of claim 10, wherein the combiner comprises a circular array.

12. The apparatus of claim 10, wherein the combiner comprises an over-sleeve coupler, a tapered coupler, or a tapered bundle fused type of coupler.

* * * * *